Feb. 3, 1970   J. E. STEVENS ET AL   3,493,923
ROAD DRIVER COMMUNICATION SYSTEM UTILIZING HALL CELL SENSOR
Filed June 9, 1967   2 Sheets-Sheet 1

INVENTORS
James E. Stevens &
William G. Trabold

Thomas N. Young
ATTORNEY

INVENTORS
James E. Stevens &
William G. Trabold

Thomas N. Young
ATTORNEY 3,493,923
ROAD DRIVER COMMUNICATION SYSTEM
UTILIZING HALL CELL SENSOR
James E. Stevens, Utica, and William G. Trabold, Royal Oak, Mich., assignors to General Motors Corporation, Detroit, Mich., a corporation of Delaware
Filed June 9, 1967, Ser. No. 644,942
Int. Cl. G08g 1/09; G08b 1/00
U.S. Cl. 340—32          7 Claims

ABSTRACT OF THE DISCLOSURE

A road-to-driver communication system including coded groups of permanent magnets located in a roadway to radiate polarized fields above the surface which are encountered in serial fashion by a vehicle traveling the roadway. The vehicle carries a sensor comprising flux collector bars mounted transverse to the direction of travel. Pole pieces mounted on the bars concentrate flux on a plurality of series connected Hall cells. The cells produce an output signal related to the number and polarity of magnets encountered. The signal may be decoded for display purposes.

SUMMARY OF THE INVENTION

The invention relates to road-to-driver communication systems and more particularly to such a system including a Hall cell sensing device mounted on the vehicle to produce a signal related to the number and polarity of magnetic fields which may be encountered by the sensor as the vehicle passes over coded magnets disposed near the surface of the roadway.

Various schemes have been devised for informing the driver of an automotive vehicle of approaching roadway conditions, routing information, or any other information which may be useful to the driver. Ordinarily, conventional traffic signs are employed for this purpose. Lack of attention or poor visibility conditions may cause a driver to miss a traffic sign.

Accordingly, it is an object of the present invention to bring information to the attention of the driver of a vehicle by way of a magnetic connection between the roadway and the vehicle. In general, this is accomplished by installing one or more magnets in or on the roadway to radiate magnetic fields of selected polarity above the surface of the roadway. Sensor means may be installed on the vehicle to produce signals corresponding to the number and polarity of magnetic fields encountered.

In accordance with the present invention, the sensor means is rendered insensitive to variation in the speed with which the magnetic fields are traversed. In general, this is accomplished through the use of Hall cells which respond to incident magnetic flux rather than the more conventional field coils which respond to the rate of change of flux.

In accordance with the invention, considerable lateral deviation in the position of the vehicle with respect to the roadway is permited without a loss of information. In general, this is accomplshed through the use of a flux collector comprising bars mounted on the vehicle transverse to the direction of travel. These bars may be several feet in length.

The invention may be best understood by reference to the following specification taken with the accompanying drawings of which:

Figures 1, 2, 3:
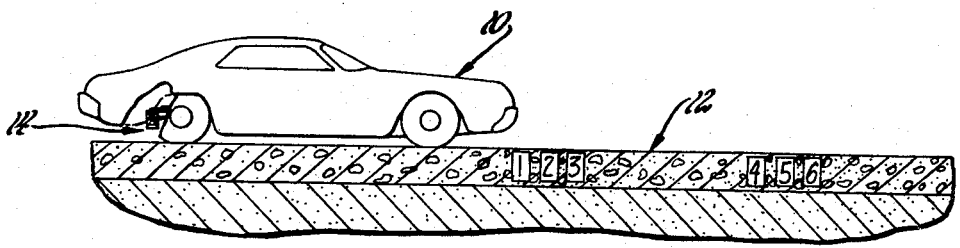
FIGURE 1 is a sectional view of a roadway showing the location of permanent magnets therein and the vehicle traveling the roadway.
FIGURE 2 shows an illustrative sensor means mounted on the rear axle of an automotive vehicle.
FIGURE 3 is a detailed view of a portion of the sensor means shown in FIGURE 2.

Referring to FIGURE 1, a conventional four-wheel automotive vehicle 10 is shown traveling the surface of a concrete roadway 12. A plurality of permanent magnets labeled 1 through 6, inclusive, are disposed in the roadway a few inches beneath the surface thereof. The permanent magnets are longitudinally polarized to radiate a plurality of magnetic fields which extend into the air space immediately above the surface of roadway 12. The six magnets are located at spaced intervals along the roadway 12 in the direction of travel for vehicle 10. The vehicle 1 therefore encounters the magnetic fields produced by the magnets 1 through 6 in a series fashion.

Vehicle 10 is equipped with sensor means 14 which, as best shown in FIGURE 2, may be mounted to the rear axle 16 of the vehicle. So mounted, the sensor 14 passes through the magnetic fields which occupy the air space above the surface of roadway 12 as the rear axle passes over the permanent magnets 1 through 6. By mounting to the axle, the sensor 14 is maintained at a relatively uniform distance from the roadway surface. The function of the sensor 14 is to determine the number of magnetic fields encountered as well as the polarities of the magnets fields, and to produce an output signal comprising a series of pulses which may be converted into information to be supplied to the driver of vehicle 10. The specific information may vary according to a preestablished code which determines the number and polarity order of the magnets 1 through 6.

Referring to FIGURE 2, sensor 14 comprises a pair of magnetically permeable flux collector bars 18 and 20. Bars 18 and 20 are interconnected at the extremities thereof by a pair of non-magnetic rods 22 and 24 such that bars 18 and 20 occupy a parallel configuration. The parallel configuration is mounted to the rear axle 16 of vehicle 10 by means of suitable mounting brackets 26 and 28. The rear axle is chosen by way of illustration and is not to be understood as limiting the invention.

A plurality of tapered pole pieces represented by 30 are mounted on bar 18 at uniformly spaced intervals. An equal number of similarly spaced pole pieces 32 are mounted on bar 20. The pole pieces 20 and 32 face one another but are separated by short air gaps as best shown in FIGURE 3. Hall cells 34 are disposed in the gaps.

Figure 4:
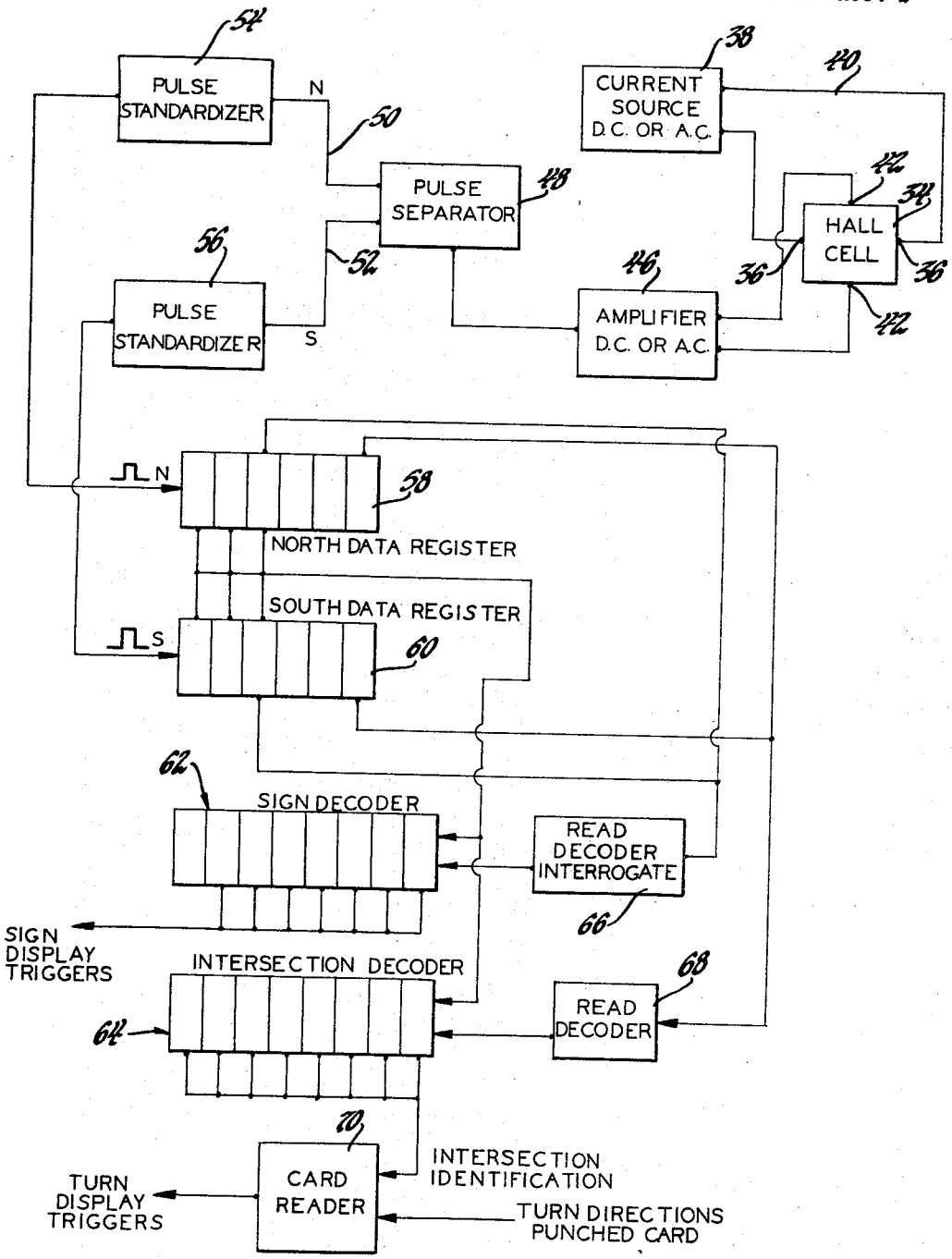
FIGURE 4 is an illustrative embodiment of a decoder apparatus which may be used in the present invention.

Each of the Hall cells 34 is equipped with input terminals 36 which are connected to a current source 38 by way of a conductor 40. Either an AC or DC source may be used in accordance with the desired type of amplification. As shown in FIGURES 2 and 3 the Hall cells 34 may be connected in series or parallel across source 38. The output terminals 42 of the cells 34 are connected to amplifier means 46 as shown in FIGURE 4. The output signal which is proportional to the product of the input current from source 38 and the flux density incident upon the cell is connected to a decoder circuit.

A detector which may be used to decode the train of output pulses produced by Hall cells 34 is shown in FIGURE 4. In the decoder illustrated, pulses of opposite polarity are separated by separator unit 48 and the number and order of pulses are decoded as an indication of both routing and traffic sign type information. Since six magnets of varying polarity are used in the roadway 12, a six-bit code is employed. No particular code is suggested herein and it is to be understood that a code using more or less than six bits may be employed.

After amplification at 46, the pulses are transmitted to a pulse separator 48 having two output channels 50 and 52. The function of the pulse separator 48 is to separate the output of amplifier 46 accoding to polarity. Accordingly, output channel 50 is designated the north polarity channel whereas channel 52 is designated the south polarity channel. Channel 50 includes a pulse standardizer 54 which may be a simple trigger circuit to produce a square output pulse upon receipt of an input signal from pulse separator 48. Channel 52 is equipped with a similar pulse standardizer 56. The output of the north channel pulse standardizer 54 is connected to a six-bit shift register 58 whereas the south channel standardizer 56 is connected to a six-bit shift register 60. The registers 58 and 60 function to receive the pulse data in serial form and to make it available in parallel form. Register 58 stores the north polarity signals whereas register 60 stores the south polarity signals. Obviously, the number of bits in registers 58 and 60 is chosen to correspond with a number of permanent magnets 1 through 6 located in roadway 12.

The first three bits of each of registers 58 and 60 are connected to the inputs of two eight-bit decoder registers 62 and 64. Decoder register 62 is labeled the "sign decoder" and may be used to decode the "sign" data carried by permanent magnets 1 through 3. Decoder register 64 is labeled the "intersection decoder" and is used to decode the "intersection identification" data which is carried by permanent magnets 4 through 6. In addition, the third bit of registers 58 and 60 is connected to a read decoder unit 66 which produces an interrogation signal upon receipt of an input. This interrogation signal is connected to decoder register 62 to read the contents of that register. The sixth bit of register 58 and 60 is connected to a read decoder unit 68 which interrogates decoder register 64. Therefore, register 62 is interrogated after permanent magnets 1 through 3 are encountered by the sensor 14 and register 64 is interrogated after permanent magnets 4 through 6 are encountered by sensor 14. The outputs of register 62 may be connected to a display unit, not shown, to produce a visual indication of the sign information to the driver of vehicle 10. The outputs of register 64 may be connected to a card reader unit 70 which may be programmed with preestablished routing information to provide an output signal to a turn display unit, not shown. This turn display unit after identifying the intersection from the information supplied by register 64 may advise the driver to either turn right or left or maintain a straight through course depending upon the desired destination.

Each of the decoder registers 62 and 64 may, for example, consist of eight ferrite cores. Each core may be wound with combinations of three of the six output lines from the first three stages of registers 58 and 60. The winding directions are such as to inhibit switching of the cores unless all three core currents are zero. The winding combination from the register stages are permuted in such a manner that for each magnet code all three inhibit currents are zero in only one of the eight decoder cores.

Describing the operation of the decoder mechanism shown in FIGURE 4, when the first magnet data reaches the output of the third register stage in either register 58 or 60, an interrogate current pulse is produced by interrogation unit 66 to read the contents of the sign decoder register 62. This interrogate signal switches only that core in which all three inhibit currents are zero. Each decoder core may be equipped with a secondary winding connected as a trigger circuit for an SCR in the sign display unit. Triggering of the SCR may illuminate an appropriate sign display lamp advising the drive of vehicle 10 of approaching roadway conditions.

At the time the data from magnet number 1 reaches the output of the sixth register stage in either register 58 or 60, the first three stages contain data from the magnets 4, 5 and 6 which, as previously described, identify the intersection. At this time an interrogate pulse is generated by the unit 68 which switches the uninhibited core in the intersection identification decoder register 64. The secondary voltage induced in each decoder core is routed to a card reader 70 where turn direction information punched in the card for the decoded intersection is added. The output voltage then triggers on one of three SCR's to illuminate left turn, straight through or right turn display lamps.

The decoder mechanism shown in FIGURE 4 is of course illustrative of only one of several techniques which may be applied in decoding the output of sensor 14. While the decoder mechanism provides both sign and intersection information from combinations of 6 permanent magnets other information as well as varying numbers of permanent magnets may of course be used.

While the invention has been described with reference to a specific embodiment this description is not to be construed in a limiting sense. For example, permanent magnets 1 through 6 may be replaced with electromagnets or other suitable means for producing a series of magnetic field regions of selected polarity.

We claim:

1. A system for communication to a vehicle from a roadway for the vehicle comprising at least one magnet associated with the roadway to radiate a magnetic field above the roadway, a vehicle adapted to travel the roadway, sensor means disposed on the vehicle and including a Hall cell having input and output terminals and positioned to encounter the field when the vehicle travels the roadway, a source of electrical energy connected to the input terminals to sensitize the Hall cell to incident flux, and output circuit means connected to the output terminals to produce a signal when the Hall cell encounters the field.

2. The apparatus defined in claim 1 including decoder means connected to the output circuit means to derive an indication of the polarity of the field.

3. In a system for communication to a vehicle from a roadway for the vehicle, a magnetic field sensor comprising a pair of magnetically permeable flux collector bars adapted to be mounted on the vehicle transverse to the path of travel, flux concentrating pole pieces mounted on the bars in mutually confronting relation but separated by an air gap, a Hall cell disposed in the air gap, and a source of electrical energy connected to the Hall cell to sensitize the cell to an incident magnetic field.

4. In a system for communication to a vehicle from a roadway for the vehicle, a magnetic field sensor comprising first and second magnetically permeable flux collector bars, nonmagnetic means connecting the bars in a parallel configuration, mounting means for mounting the bars on a vehicle transverse to a path of travel of the vehicle, a first plurality of pole pieces mounted on the first bar at spaced points along the bar, a second plurality of pole pieces mounted on the second bar at spaced points along the bar and facing the first pole pieces but spaced therefrom to produce a plurality of air gaps, a plurality of Hall cells disposed in the air gaps between the pole pieces, each of said Hall cells having input and output terminals, a source of electrical energy and means connecting the source in series with the plurality of Hall cells to sensitize the cells to magnetic flux.

5. The apparatus defined in claim 4 including decoder means connected to the output terminals of the Hall cells for determining the number and polarity of magnetic flux field incident upon the Hall cells in a given time period.

6. A system for communication between a vehicle and a roadway for the vehicle comprising: a roadway for accommodating vehicular traffic, a plurality of magnets disposed in the roadway to radiate a plurality of magnetic fields along the roadway, said magnets being spaced along the roadway so as to be encountered in series fashion by a vehicle traveling the roadway, and sensor means as defined in claim 5.

7. The apparatus defined in claim 6 wherein the vehicle is equipped with at least one axle for supporting a pair of road wheels, the sensor means being mounted to the axle.

References Cited

UNITED STATES PATENTS

| | | | |
|---|---|---|---|
| 1,803,292 | 4/1931 | Adler | 340—32 |
| 2,493,755 | 1/1950 | Ferrill | 340—32 |
| 3,179,918 | 4/1965 | Hoeppol | 340—32 |

THOMAS B. HABECKER, Primary Examiner

U.S. Cl. X.R.

94—1; 340—168